US012039804B2

(12) United States Patent
Okur et al.

(10) Patent No.: US 12,039,804 B2
(45) Date of Patent: Jul. 16, 2024

(54) INTELLIGENT ANALYSIS AND AUTOMATIC GROUPING OF ACTIVITY SENSORS

(71) Applicant: RAPSODO PTE. LTD., Singapore (SG)

(72) Inventors: Batuhan Okur, Singapore (SG); Roshan Gopalakrishnan, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 260 days.

(21) Appl. No.: 17/459,981

(22) Filed: Aug. 27, 2021

(65) Prior Publication Data

US 2023/0060394 A1 Mar. 2, 2023

(51) Int. Cl.
A63B 24/00 (2006.01)
G06F 18/214 (2023.01)
(Continued)

(52) U.S. Cl.
CPC .......... *G06V 40/23* (2022.01); *A63B 24/0003* (2013.01); *A63B 24/0062* (2013.01);
(Continued)

(58) Field of Classification Search
CPC ............ A63B 24/0003; A63B 24/0062; A63B 2220/05; A63B 2230/62; A63B 2220/836;
(Continued)

(56) References Cited

U.S. PATENT DOCUMENTS

| 2020/0069210 A1 | 3/2020 | Berenzweig et al. |
| 2020/0093419 A1 | 3/2020 | Kirby et al. |

(Continued)

FOREIGN PATENT DOCUMENTS

| CN | 108096807 A | 6/2018 |
| WO | 2021/080967 A1 | 4/2021 |

OTHER PUBLICATIONS

PCT International Search Report and Written Opinion issued in corresponding application No. PCT/IB2022/058027, dated Mar. 1, 2023.

(Continued)

*Primary Examiner* — Xilin Guo
(74) *Attorney, Agent, or Firm* — Scully, Scott, Murphy & Presser, PC

(57) ABSTRACT

A method may include obtaining sensor data from one or more activity sensors, each of the activity sensors being coupled to a respective area of a sports user. The method may include obtaining image data of the sports user and each of the activity sensors coupled to the sports user. The method may include identifying, by a machine learning module and based on the sensor data and the image data, a respective muscle associated with each respective area to which the activity sensors are coupled. The method may include identifying movement of the sports user based on the sensor data from the activity sensors and the identified body part. The method may include analyzing the identified movement of the sports user including evaluating a body posture of the sports user, identifying one or more movement patterns of the sports user, and/or performing an injury assessment for the sports user.

20 Claims, 5 Drawing Sheets

(51) Int. Cl.
*G06F 18/22* (2023.01)
*G06F 18/25* (2023.01)
*G06N 20/00* (2019.01)
*G06T 7/00* (2017.01)
*G06T 17/00* (2006.01)
*G06V 40/10* (2022.01)
*G06V 40/20* (2022.01)

(52) U.S. Cl.
CPC ............ *G06F 18/214* (2023.01); *G06F 18/22* (2023.01); *G06F 18/25* (2023.01); *G06N 20/00* (2019.01); *G06T 7/0012* (2013.01); *G06T 17/00* (2013.01); *G06V 40/103* (2022.01); *A63B 2220/05* (2013.01); *A63B 2230/62* (2013.01); *G06T 2207/20081* (2013.01); *G06T 2207/30196* (2013.01); *G06T 2207/30221* (2013.01)

(58) Field of Classification Search
CPC ........... A63B 24/0075; G06K 9/00342; G06K 9/00369; G06K 9/6201; G06K 9/6256; G06K 9/6288; G06N 20/00; G06T 17/00; G06T 7/0012; G06T 2207/20081; G06T 2207/30196; G06T 2207/30221; G06T 7/246; A61B 5/389; A61B 5/1118; A61B 2562/0219; A61B 5/0205; A61B 5/11; A61B 5/0022; G06F 21/32; G06F 11/3438; G06F 3/015; G06F 3/017; G06F 3/011; A61M 5/1723; A61M 2230/63; G06V 40/23; G06V 40/28; G06V 40/25; G06V 20/42; G06V 10/74; G06V 40/20; G06V 20/40; H04L 67/535; A41D 2600/10; G09B 19/0038

See application file for complete search history.

(56) References Cited

U.S. PATENT DOCUMENTS

2020/0202734 A1   6/2020  Agnew
2022/0296129 A1*  9/2022  Dodemont ............ A61B 5/053

OTHER PUBLICATIONS

Examination Report dated Apr. 26, 2024 issued in related GB2403409.2.

* cited by examiner

INTELLIGENT ANALYSIS AND AUTOMATIC GROUPING OF ACTIVITY SENSORS

The present disclosure generally relates to intelligent analysis and automatic grouping of activity sensors.

BACKGROUND

Performance of a player in a given sport may depend on how the player performs sports-specific actions and/or moves his or her body. Muscle movements and conditions of the player may relate to the manner in which the player performs sports-specific actions and/or moves his or her body. Evaluating muscle movement and conditions may improve understanding and analysis of sports play.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining sensor data from one or more activity sensors, each of the activity sensors being coupled to a respective area of a sports user. The method may include obtaining image data of the sports user and each of the activity sensors coupled to the sports user. The method may include identifying, by a machine learning module and based on the sensor data and the image data, a respective muscle associated with each respective area to which the activity sensors are coupled. The method may include identifying movement of the sports user based on the sensor data from the activity sensors and the identified body part. The method may include analyzing the identified movement of the sports user including evaluating a body posture of the sports user, identifying one or more movement patterns of the sports user, and/or performing an injury assessment for the sports user.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Coupling one or more activity sensors to a respective area of a sports user may facilitate tracking and analysis of muscle movements and conditions. The areas of the sports user to which the activity sensors are coupled may correspond to one or more muscles of the sports user such that the activity sensors may assess muscle activity based on metrics such as sweat activity level and/or electromyography (EMG) measurements. However, existing activity sensors and methods of collecting sensor data, such as intramuscular EMG and/or surface EMG, may be inefficient and include various disadvantages. In particular, both intramuscular EMG and surface EMG include cumbersome and time-consuming preparation steps for ensuring accurate collection of sensor data. For example, intramuscular EMG includes preparatory steps that require accurate selection of muscles and positioning of needles to facilitate sensor data collection. As another example, usage of surface EMG may be comparatively easier to prepare than usage of intramuscular EMG, but implementing surface EMG also requires preparatory steps such as rubbing the surface of the skin on which the activity sensors are supposed to be attached with alcohol. Additionally, identification and tagging of each activity sensor coupled to one or more sports users becomes increasingly complicated as the number of activity sensors and/or the number of sports users increases because the pairing of activity sensors to sports users must be performed manually for each of the activity sensors. As such, identifying and pairing each of the activity sensors to a particular sports user may become increasingly tedious without automated configuration of the activity sensors.

The embodiments described in the present disclosure may facilitate automatic identification and/or pairing of activity sensors to one or more sports users via intelligent analysis and grouping of activity sensors, which may improve availability of sensor data relating to each of the sports users. In some embodiments, one or more activity sensors may be coupled to an area of a number of sports users without performing preparatory steps. A single-camera and/or a multi-camera system may collect image data that includes positioning information about the sports users and any movements associated with each of the sports users to estimate a three-dimensional body pose corresponding to each sports user. The activity sensors and the camera system may continuously transmit sensor data and image data, respectively, to a receiver such that the sensor data and the image data may be combined to identify user-sensor pairings. The sensor data and the image data may be analyzed to provide feedback about muscle movements of the sports users.

Embodiments of the present disclosure are explained with reference to the accompanying figures.

Figure 1:
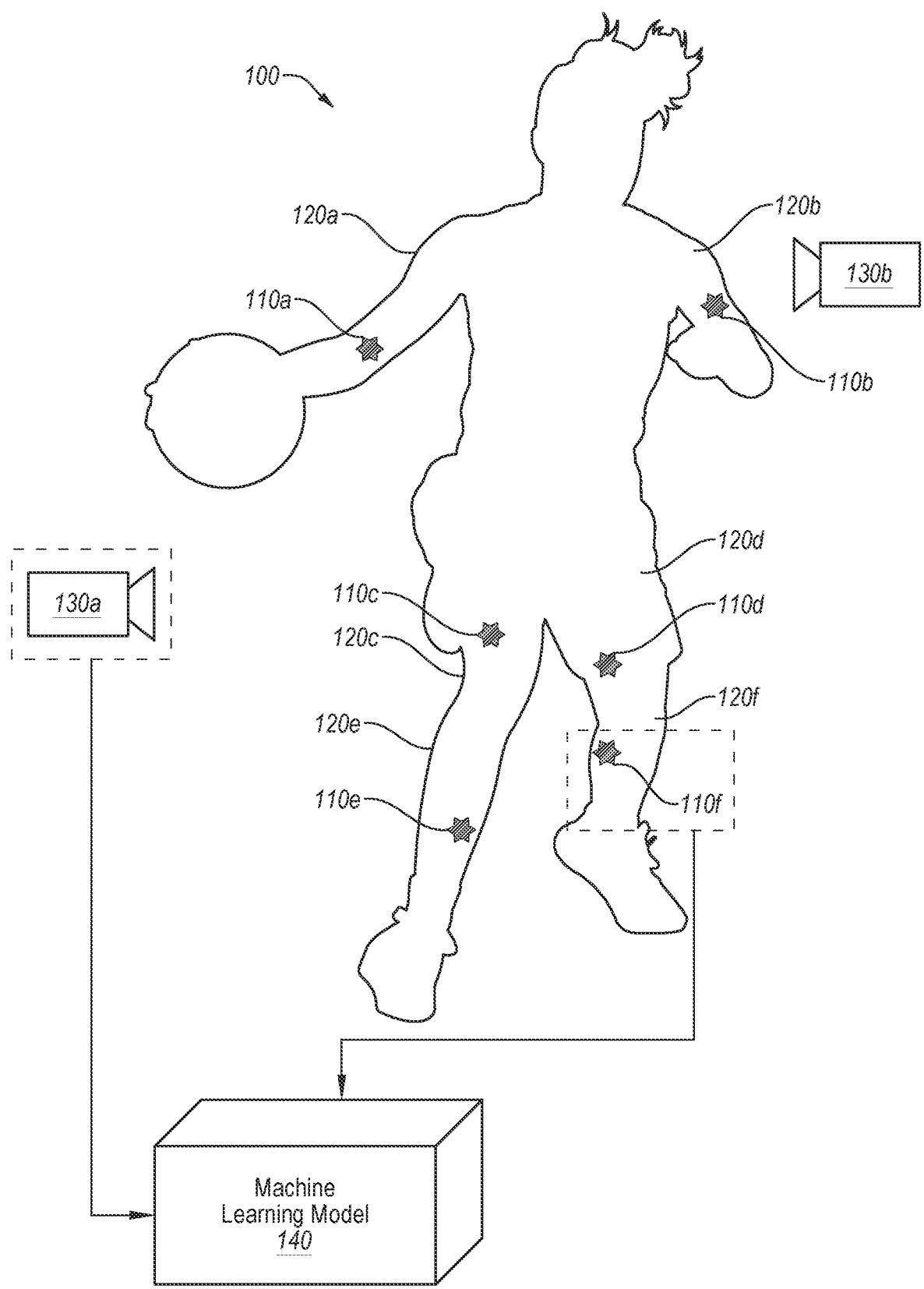
FIG. 1 illustrates an example system for sensor placement detection according to the present disclosure.

FIG. 1 illustrates an example system 100 for sensor placement detection according to the present disclosure. The system 100 may include one or more activity sensors 110a-110f ("activity sensors 110") and one or more cameras 130a and 130b ("cameras 130"). Each of the activity sensors 110a-110f may be coupled to a respective area 120a-120f ("areas 120") of the sports user. For example, a first activity sensor 110a may be coupled to a first area 120a of the sports user, a second activity sensor 110b may be coupled to a second area 120b of the sports user, etc. Image data captured by the cameras and sensor data captured by the activity sensors 110 may be obtained by a machine learning model 140.

The activity sensors 110 may obtain sensor data describing muscle activity of the sports user to which the activity sensors 110 are coupled. In some embodiments, the sensor data describing muscle activity may include EMG measurements indicative of electrical activity produced by muscles of the sports user. Such electrical activity may be measured based on the electrical potential of the muscles corresponding to the areas 120 of the sports user at which the activity sensors 110 are positioned. The EMG measurements may provide information about the corresponding muscles, such as an activation level and/or a recruitment order of the corresponding muscles. Additionally or alternatively, the activity sensors 110 may include pressure sensors configured to measure contraction and/or expansion of muscles corresponding to the areas 120 of the sports user. Additionally or alternatively, the activity sensors 110 may include sweat sensors configured to measure the presence of biomarkers in the sweat of the sports user and/or chemical potential sensors configured to measure lactic acid build-up in the muscles of the sports user. Additionally or alternatively, the activity sensors 110 may be configured to measure other types of data including temperature, electrical potential, and/or other types of biometric data. Additionally or alternatively, the activity sensors 110 may be configured to measure three-dimensional data of a sports user based on an orientation, a rotational angle and/or direction, a speed, and/or other physical parameters relating to movement of the sports user.

The activity sensors 110 may be placed on the skin surface of the sports user at the corresponding areas 120. As such, the activity sensors 110 may include external sensors that do not require direct contact with one or more muscles of the sports user to obtain sensor data associated with the muscles of the sports user. Because the areas 120 of the sports user correspond to muscles of the sports user, placement of the activity sensors 110 on areas 120 of the sports user proximate to one or more muscles of interest for analysis of the sensor data may facilitate more accurate collection of the sensor data. In these and other embodiments, a surface area of each of the activity sensors 110 may be smaller than the surface area of each of the areas 120 corresponding to muscles of the sports user such that placement of the activity sensors 110 may not need to be precise. For example, a particular activity sensor may be positioned on an upper arm of a sports user to obtain sensor data about the bicep of the sports user. In this example, the particular activity sensor on the upper arm of the sports user may not require precise positioning because the particular activity sensor may be positioned on one or more areas on the upper arm of the sports user to obtain sensor data about the bicep. Additionally or alternatively, placement of the activity sensors 110 may be more sensitive in situations where the target muscle is small and/or multiple muscles correspond to the same area 120 of the sports user.

The cameras 130 may be configured to capture one or more images indicating positioning and/or movement of the activity sensors 110 coupled to the areas 120 of the sports user. In some embodiments, the cameras 130 may be positioned to capture images including the entirety of the sports user and/or all of the activity sensors 110 coupled to the areas 120 of the sports user. Additionally or alternatively, each of the cameras 130 may be positioned to capture images including a portion of the sports user and/or a portion of the activity sensors 110 coupled to the areas 120 of the sports user. For example, a first camera may be positioned near ground level to capture images associated with the lower bodies of one or more sports users including images of the activity sensors 110 positioned on areas 120 located on the lower bodies of the sports users, and a second camera may be positioned to capture images associated with the upper bodies of the sports users.

In these and other embodiments, two or more cameras 130 may capture images associated with the same sports user and/or the same activity sensors 110 from different angles. Capturing images including multiple angles of the same sports user and/or the same activity sensors 110 may reduce the number of blind spots created by movement of the sports users and/or the activity sensors 110 (e.g., moving outside of a camera's field of view and/or obstruction of line of sight to a first sports user by a second sports user). Additionally or alternatively, capturing images associated with the same sports user and/or the same activity sensors 110 from different angles may facilitate more accurate identification and/or pairing of activity sensors 110 as described in further detail below.

The cameras 130 may include any device, system, component, or collection of components configured to capture images. Although two cameras 130 are illustrated in relation to the system 100 with reference to FIG. 1, any number of cameras may be contemplated. The cameras 130 may include optical elements such as, for example, lenses, filters, holograms, splitters, etc., and an image sensor upon which an image may be recorded. Such an image sensor may include any device that converts an image represented by incident light into an electronic signal. The image sensor may include a plurality of pixel elements, which may be arranged in a pixel array (e.g., a grid of pixel elements); for example, the image sensor may comprise a charge-coupled device (CCD) or complementary metal-oxide-semiconductor (CMOS) image sensor. The pixel array may include a two-dimensional array with an aspect ratio of 1:1, 4:3, 5:4, 3:2, 16:9, 10:7, 6:5, 9:4, 17:6, etc., or any other ratio. The image sensor may be optically aligned with various optical elements that focus light onto the pixel array, for example, a lens. Any number of pixels may be included such as, for example, eight megapixels, 15 megapixels, 20 megapixels, 50 megapixels, 100 megapixels, 200 megapixels, 600 megapixels, 1000 megapixels, etc.

The cameras 130 may operate at certain framerates or be able to capture a certain number of images in a given time. The cameras 130 may operate at a framerate of greater than or equal to about 30 frames per second. In a specific example, cameras 130 may operate at a framerate between about 100 and about 300 frames per second. In some embodiments, a smaller subset of the available pixels in the pixel array may be used to allow for the cameras 130 to operate at a higher framerate; for example, if a moving object (e.g., the sports user, the areas 120 corresponding to the sports user, and/or the activity sensors 110 coupled to the areas 120) is known or estimated to be located in a certain quadrant, region, or space of the pixel array, only that quadrant, region, or space may be used in capturing the image allowing for a faster refresh rate to capture another image. Using less than the entire pixel array may allow for the use of less-expensive cameras while still enjoying a higher effective framerate.

Various other components may also be included in the cameras 130. Such components may include one or more illuminating features such as a flash or other light source, a light diffuser, or other components for illuminating an object. In some embodiments, the illuminating features may be configured to illuminate the moving object when it is proximate the image sensor, for example, when the moving object is within three meters of the image sensor.

Any number of a variety of triggers may be used to cause the cameras 130 to capture one or more images of the moving object. By way of non-limiting examples, the cameras 130 may be triggered when the moving object is known or estimated to be in the field of view of the cameras 130, when the moving object first begins or modifies its movement (for example when a sports user begins running, when a sports user jumps, when a limb of the sports user extends into the field of view of the cameras, etc.), when the moving object is detected at a leading row of pixels in the pixel array, etc. Another example of a trigger may be a persisting peak in a spectrum of reflected microwaves. For example, if there is consistently a peak at a given frequency known to be in an expected moving object frequency for a given duration of time, this may act as a triggering event.

In some embodiments, the cameras 130 may have a field of view in which images may be captured. The field of view may correspond to the pixel array. In some embodiments, the field of view may be limited such that the moving object only spends a limited amount of time within the field of view. In such embodiments, the cameras 130 may be triggered to capture images while the moving object is within the field of view. The time in which the moving object is within the field of view of the cameras 130 may be referred to as an optimal photograph timeframe. In some embodiments, the optimal photograph timeframe may include when only the entire the moving object is within the field of view or may include when only a portion of the moving object is within the field of view. Other factors may also contribute to the optimal photograph timeframe, such as the distance between the image sensor and the moving object, the amount of illumination that may be provided by an illuminating feature, etc. For example, the optimal photograph timeframe may occur when the moving object is traveling between three meters and one meter away from the cameras 130 as that may be where a flash of the cameras 130 provides illumination of the moving object.

Figure 5:
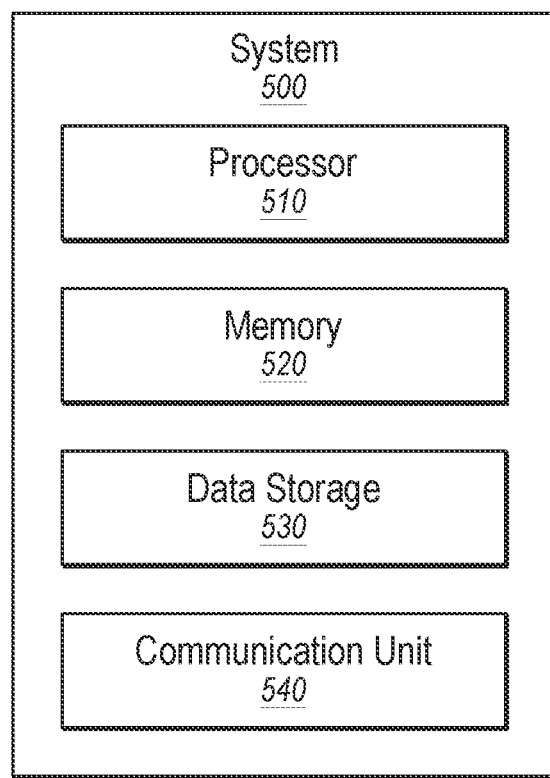
FIG. 5 is an example computing system.

The sensor data captured by the activity sensors 110 and the image data captured by the cameras 130 may be obtained by a computing system, such as computing system 500 of FIG. 5. The sensor data captured by the activity sensors 110 and the image data captured by the cameras 130 may include timestamps indicating at what time each of the datum were captured. In some embodiments, the activity sensors 110, the cameras 130, and/or the computing system to which the sensor data and image data are sent may include an internal clock indicating the time at which data are captured and/or obtained. Additionally or alternatively, the data may be tagged with a relative timestamp indicating when the data were captured relative to a time at which a first image datum and/or a first sensor datum was obtained (e.g., the first image datum and/or first sensor datum is assigned a timestamp of "t0").

The sensor data and the image data may be used to train the machine learning model 140 to recognize to which sports user and to which muscle of the sports user a given activity sensor is coupled. In some embodiments, the machine learning model 140 may be trained to identify muscles of the sports users and/or assess muscle activity based on the obtained image data and sensor data. In some embodiments, the machine learning model 140 may be trained to identify the muscles associated with the areas 120 to which the activity sensors 110 are coupled. Because initial placement of the activity sensors 110 on the sports users may be arbitrary and such activity sensors 110 may be uncalibrated, the machine learning model 140 may be trained and configured to pair obtained sensor data with corresponding activity sensors identified in the image data. Additionally or alternatively, the machine learning model 140 may be trained to recognize patterns in muscle activity of the sports user based on the image data obtained by the cameras 130 and the sensor data obtained by the activity sensors 110. For example, the machine learning model 140 may be trained to recognize patterns such as increased muscle activity responsive to identifying flexed muscles in the image data, increased lactic acid levels responsive to identifying a resting sports user after running a marathon, etc.

In some embodiments, the machine learning model 140 may employ machine learning algorithms and training of the machine learning model 140 may be supervised, unsupervised, or some combination thereof. For example, the machine learning model 140 may be trained using a Decision Tree, Naive Bayes Classifier, K-Nearest Neighbors, Support Vector Machines, Linear Regression, Logistic Regression, Dimensionality Reduction, and/or Artificial Neural Networks. The machine learning model 140 may be employed in any of the methods herein to perform actions with increasing effectiveness and accuracy over time, as the machine learning model learns and is periodically retrained to make more accurate predictions or decisions. For example, any of the actions in the methods disclosed herein, or any other action, may be performed by the machine learning model 140 in order to perform these actions with increasing effectiveness and accuracy over time as the machine learning model 140 learns.

Training the machine learning model 140 to identify and/or pair each of the activity sensors to a respective area of a sports user may be facilitated by using training sensor data and training image data. In some embodiments, training the machine learning model 140 may be based on correlating the training sensor data to the training image data. In some embodiments, the activity sensors configured to obtain the training sensor data may already be identified and/or paired to a respective area of a training sports user such that the training sensor data and the training image data includes accurate sensor-area pairings.

A trained machine learning model 140 may be configured to output information about the environment and/or sports users based on newly captured sensor data and image data. In some embodiments, the trained machine learning model 140 may identify a number of activity sensors included in a given environment. For example, the trained machine learning model 140 may count the number of activity sensors based on newly captured image data of the given environment and/or determine a number of activity data sources based on newly captured sensor data. In some embodiments, the environment may include more than one sports user, and the trained machine learning model 140 may be configured to identify to which sports user each of the activity sensors is coupled by collating the newly captured image data with the timing of data collection and/or the newly captured sensor data. As such, the trained machine learning model 140 may additionally or alternatively identify the muscles from which the activity sensors capture sensor data. Additionally or alternatively, the machine learning model 140 may be configured to generate a three-dimensional body-pose model of the sports user and/or a three-dimensional movement-simulation model of movements of the sports user.

In an example, a given environment may include a tennis court in which a first tennis player is positioned on a first side of the tennis court and a second tennis player is positioned on a second side of the tennis court opposite to the first side. Each of the tennis players may have a first activity sensor coupled to the upper arms of the tennis players and a second activity sensor coupled to the forearms of the tennis players such that four activity sensors are included in the given environment. Image data may of the given environment, the tennis players, and/or the activity sensors may be captured by one or more cameras positioned around the given environment, such as from an elevated position behind either tennis player, from a referee chair, at either ends of the tennis net, etc. Based on the image data, the machine learning model 140 may determine that the number of sports users included in the given environment is two, and two activity sensors are coupled to each of the sports users. When the first tennis player swings his/her tennis racket, the activity sensors coupled to the first tennis player may capture sensor data indicating muscle activity at a given point in time. At the same given point in time, the activity sensors coupled to the second tennis player may capture sensor data indicating muscle tension but no activity.

Based on the differences in sensor data between the activity sensors coupled to the first tennis player and the activity sensors coupled to the second tennis player, the machine learning model 140 may pair the captured sensor data to each of the activity sensors. After pairing the activity sensors, the machine learning model 140 may be configured to analyze movements of the tennis players based on sensor data. For example, the machine learning model 140 may determine that the first tennis player is performing a smash as opposed to a slice based differences in the sensor data obtained from the first activity sensor and the second activity sensor coupled to the first tennis player.

Figure 2:
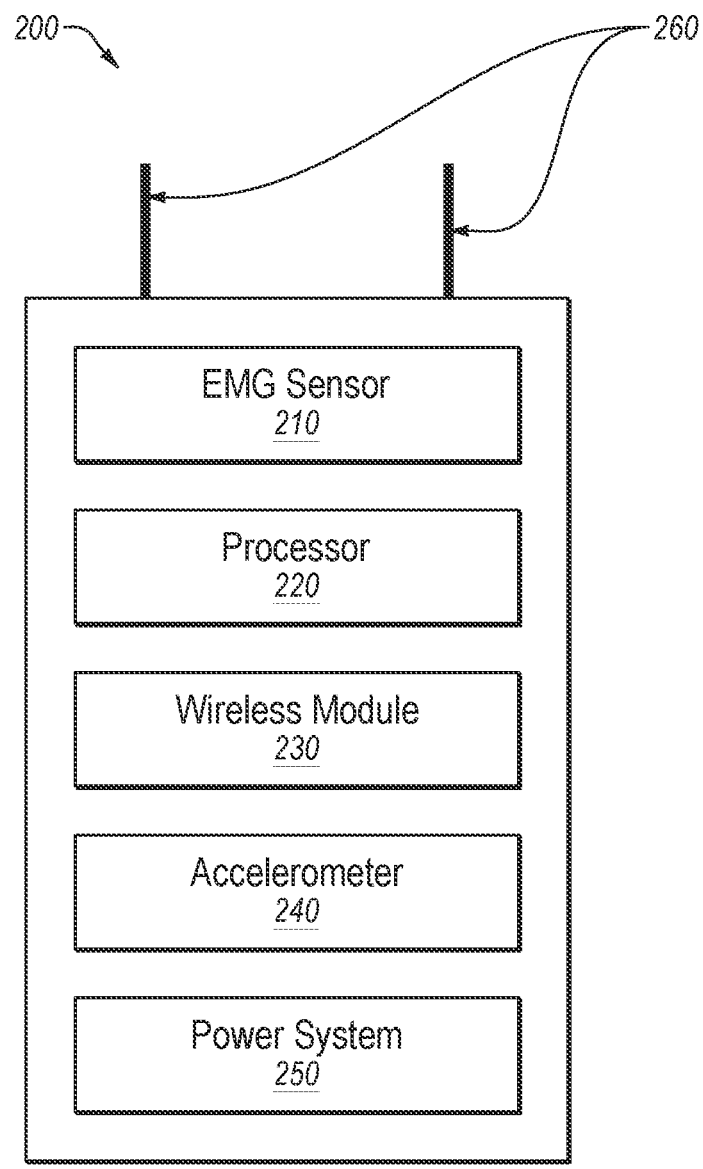
FIG. 2 illustrates a diagram of a sensor according to the present disclosure.

FIG. 2 illustrates a diagram of an activity sensor 200 according to the present disclosure. In some embodiments, the activity sensor 200 may include an EMG sensor 210, an accelerometer 240, and/or any other sensor configured to obtain information about muscle activity. In some embodiments, the activity sensor 200 may include one or more output leads 260 to facilitate attachment of the activity sensor 200 to a sports user. In some embodiments, the activity sensor 200 may include a processor 220, a wireless module 230, and/or any other components to facilitate on-board processing of captured sensor data. The data-processing elements of the activity sensor 200 including the processor 220 and the wireless module 230 may be similar to or the same as the computing system 500 described in further detail below in relation to FIG. 5. In some embodiments, the activity sensor 200 may include a power system 250 configured to provide energy for the sensors (e.g., the EMG sensor 210 and/or the accelerometer 240) and/or the processor 220, and/or the wireless module 230.

In some embodiments, the activity sensor 200 may include one or more sensors configured to collect information about the physical state and/or arrangement of the activity sensor 200 when coupled to a sports user. For example, the activity sensor 200 may include the accelerometer 240 configured to determine the movement of the sports user, a gyroscope configured to determine the orientation of the activity sensor 200 and/or the sports user, and/or any other such sensors. In some embodiments, the physical information obtained by such sensors may be obtained by the machine learning model as another source of information that facilitates muscle identification, activity sensor pairings, etc.

The power system 250 may be configured to provide energy to the activity sensor 200 during its operation. In some embodiments, the power system 250 may include a rechargeable battery, such as a lithium ion battery. Additionally or alternatively, the power system 250 may include single-use batteries, such as button cells, and the activity sensor 200 may be discarded after usage. In embodiments including a rechargeable power system 250, the activity sensor 200 may be charged between uses. For example, one or more activity sensors 200 may be collected before and/or after use and placed in a wireless charging area (e.g., a docking container). Additionally or alternatively, two or more activity sensors 200 may be coupled to one another, such as via a wired connection, to form a system of activity sensors. The power systems 250 associated with the system of activity sensors may be charged using a wireless or wired charging port. For example, a number of activity sensors 200 may be attached to an article of clothing, such as a sports jersey, and each of the activity sensors 200 attached to the article of clothing may be connectively coupled. The article of clothing may include a charging port configured to provide energy to the activity sensors 200 when the charging port is connected to an energy source.

Modifications, additions, or omissions may be made to the activity sensor 200 as described in FIG. 2 without departing from the scope of the present disclosure, For example, the activity sensor 200 may include more or fewer elements than those illustrated and described in the present disclosure.

Figure 3:
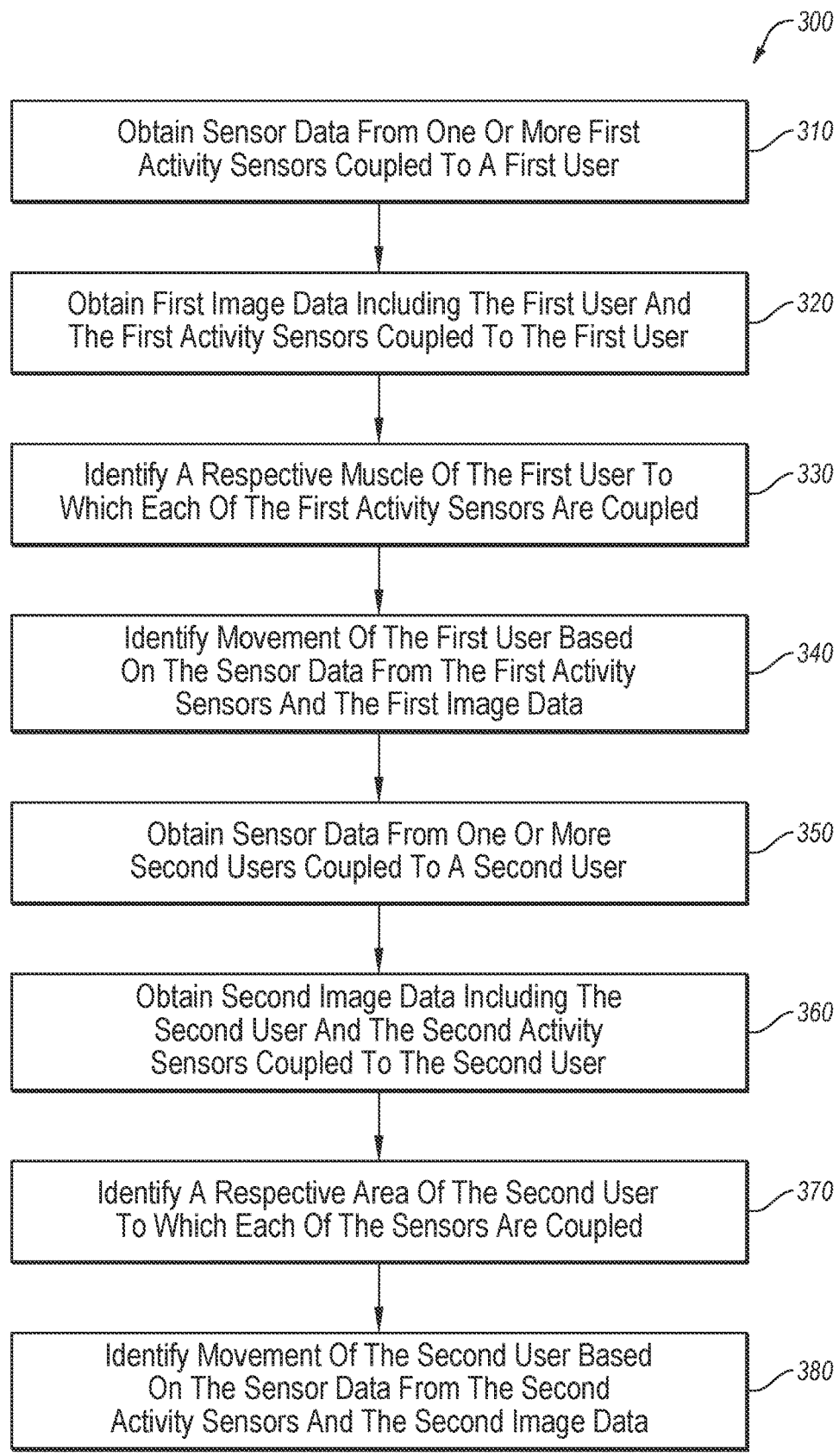
FIG. 3 is a flowchart of an example method of providing feedback about muscle movements of one or more sports users according to the present disclosure.

FIG. 3 is a flowchart of an example method 300 of providing feedback about muscle movements of one or more sports users according to the present disclosure. The method 300 may be performed by any suitable system, apparatus, or device. For example, the activity sensor 200 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

The method may begin at block 310 in which sensor data from one or more first activity sensors coupled to a first sports user may be obtained. The first activity sensors coupled to the first sports user may obtain sensor data that is include the same or similar types of information as activity sensors coupled to other sports users. For example, all of the activity sensors may obtain EMG data, sweat data, and/or other biometric data about the sports users to whom the activity sensors are coupled. As such, identifying the first activity sensors coupled to the first sports user in an environment including more than one sports user may be infeasible based on the sensor data alone. In some embodiments, the sensor data may include a identification signature such that all of the sensor data originating from a particular activity sensor includes the same identification signature. Additionally or alternatively, the activity sensors may obtain orientation and/or movement information corresponding to the orientation and/or movements of the sports user based on sensor data obtained from accelerometers, gyroscopes, etc. included in the activity sensors as described above in relation to FIG. 2.

At block 320, image data of the first sports user and the first sensors coupled to the first sports user may be obtained. The image data may be captured by one or more cameras positioned around a sports environment including the one or more sports users and the activity sensors coupled to each of the sports users. In some embodiments, the image data may facilitate determining a number of sports users included in a given sports environment and/or a number of activity sensors coupled to each of the sports users. In these and other embodiments, the image data may facilitate identification of the first sports user out of the multiple sports users included in a given sports environment.

One or more criteria for identifying a specific sports user, such as the first sports user, may be determined based on characteristics of the given sports environment. For example, a particular sports environment may include a soccer field, and the first sports user may be identified based on a color of a jersey and/or a number included on the back of the jersey worn by the first sports user. As another example, a particular sports environment may include a tennis court, and the first sports user may be identified based on a section of the tennis court in which the first sports user stays for the duration of a tennis match.

At block 330, a respective area of the first sports user to which each of the first activity sensors are coupled may be identified. In some embodiments, each of the first activity sensors identified as being coupled to the first sports user may be analyzed sequentially to identify the sensor data to which the activity sensors correspond. In some embodiments, pairing a given activity sensor to its corresponding sensor data may include chronologically analyzing the movement and/or the sensor data associated with the given activity sensor.

For example, the image data may indicate the given activity sensor moves in a particular direction, changes orientation, should detect a specific sensor data value, etc. in a particular time frame. One or more of the sensor data readings obtained by the activity sensors in the particular time frame may not correspond to the assumptions made based on the image data, and such sensor data readings may be ignored. Additional assumptions may be made based on the image data of the given activity sensor in a second particular time frame, and one or more additional sensor data readings may be ignored. This process may be repeated until only one of the sensor data readings corresponds to the image data of the given activity sensor.

At block 340, movements of the first sports user may be analyzed based on the sensor data from the first activity sensors and the first image data. In some embodiments, the movements of the first sports user may be analyzed to assess the body posture, identify one or more movement patterns, and/or perform an injury assessment for the first sports user as described above in relation to FIG. 1.

At block 350, sensor data from one or more second activity sensors coupled to a second sports user may be obtained. The sensor data associated with the second activity sensors may be obtained by the same or a similar process as obtaining the sensor data associated with the first activity sensors as described above in relation to the step at block 310.

At block 360, image data of the second sports user and the second activity sensors coupled to the second sports user may be obtained. The image data associated with the second sports user and/or the second activity sensors may be obtained by the same or a similar process as obtaining the image data associated with the first sports user and/or the first activity sensors as described above in relation to the step at block 320.

At block 370, a respective area of the second sports user to which each of the second activity sensors are coupled may be identified. In some embodiments, each of the second activity sensors identified as being coupled to the second sports user may be analyzed sequentially to identify the sensor data to which the activity sensors correspond. In these and other embodiments, the sensor data identified as being associated with the first activity sensors may be excluded from the pairing analysis of the second activity sensors and the sensor data.

At block 380, movements of the second sports user may be analyzed based on the sensor data from the second activity sensors and the second image data. In some embodiments, the movements of the second sports user may be analyzed to assess the body posture, identify one or more movement patterns, and/or perform an injury assessment for the second sports user as described above in relation to FIG. 1.

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

Figure 4:
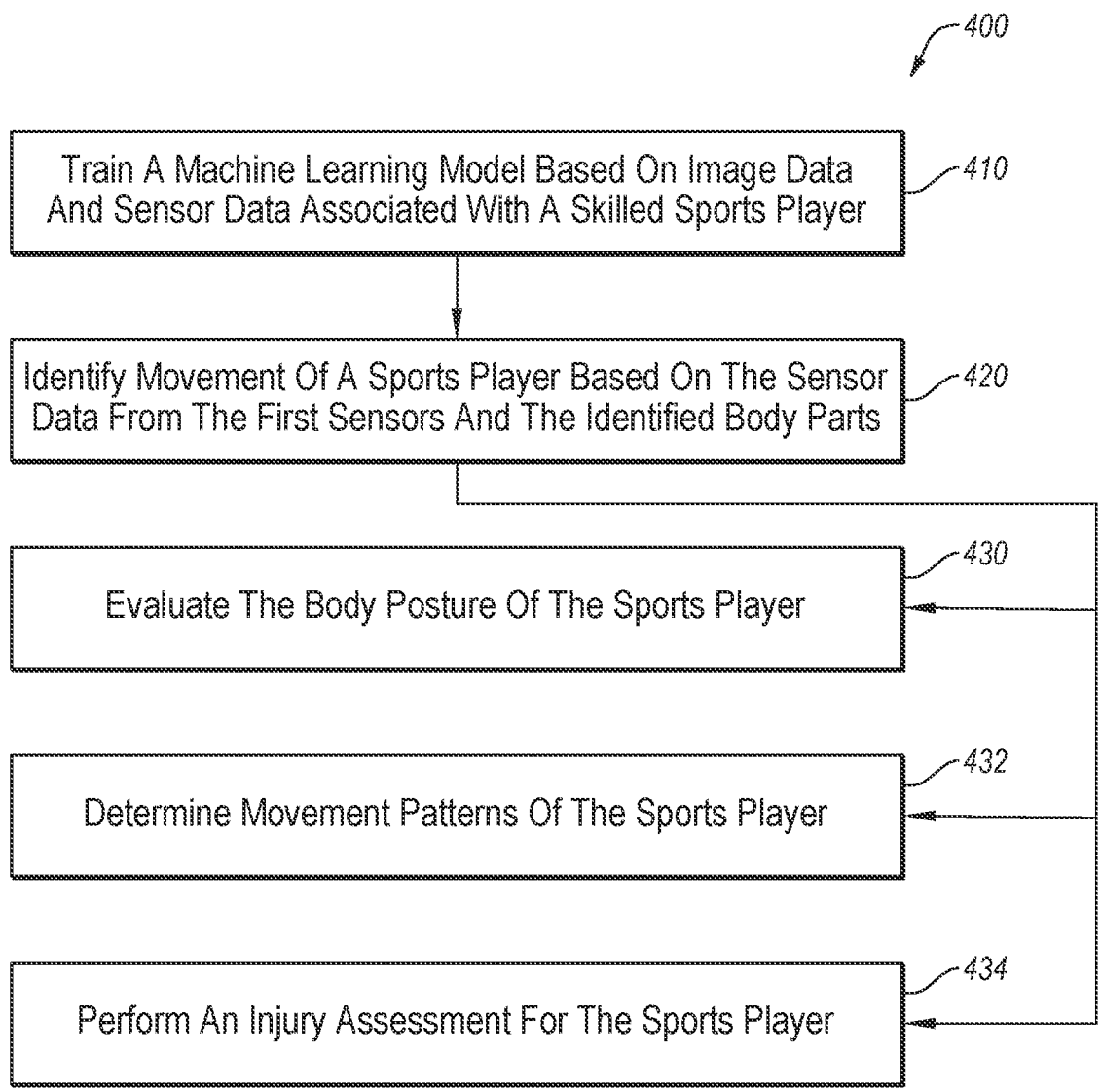
FIG. 4 is a flowchart of an example method of analyzing movement of a sports user based on the activity sensor data according to the present disclosure.

FIG. 4 is a flowchart of an example method of analyzing movement of a sports user based on the activity sensor data according to the present disclosure. The method 400 may be performed by any suitable system, apparatus, or device. For example, the activity sensor 200 may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 410 in which a machine learning model may be trained based on image data and sensor data associated with a skilled sports player. Training the machine learning model to recognize and critique the body posture of the sports user may include providing image data and sensor data associated with one or more movements of a skilled sports player (e.g., a professional athlete). In some embodiments, the skilled sports player may repeat the movements to provide additional image data and sensor data such that the machine learning model may determine patterns in the training data associated with each of the movements and reduce statistical noise effects on the data.

At block 420, movements of a sports player may be identified based on image data and sensor data associated with the sports player. In some embodiments, pairing the image data and the sensor data to the sports player and/or identification of the movements of the sports player may be performed according to the steps described above in relation to method 300.

At block 430, one or more body postures of the sports player may be analyzed. In some embodiments, body posture analysis may be based on a comparison between the movements of the skilled sports player and the movements of the sports player. In some embodiments, the trained machine learning model may evaluate the body posture of a sports player based on image data and sensor data associated with the sports player. For example, the trained machine learning model may compare the image data and/or the sensor data associated with the sports player to the training data associated with the skilled sports player and determine a degree of similarity between the body postures of the sports player and the skilled sports player. Additionally or alternatively, the trained machine learning model may highlight specific differences between body postures of the sports player and the skilled sports player. For example, the sports player may have a more hunched back, less squared shoulders, a wider stance, tenser arms, poor weight distribution, etc. than the skilled sports player.

At block 432, one or more movement patterns of the sports player may be identified. In some embodiments, image data and sensor data associated with a particular sports player may be collected over a period of time as the training data, and patterns in the behavior of the particular sports player may be identified based on the training data and/or newly obtained image data and sensor data. For example, the machine learning model may identify a habitual movement of the particular sports player, such as an arm-pumping motion immediately prior to making a basketball shot. As another example, the machine learning model may identify differences in the behavior of the particular sports player based on image data and/or sensor data differing from habitual movements of the particular sports player, and such differences in behavior may be tagged as "mistaken" movements.

At block 434, an injury assessment may be performed for the sports player. In some embodiments, image data and sensor data captured immediately before and/or after occurrence of an injury may be analyzed by the machine learning model and/or provided to a reviewing user for examination. In some situations, the image data may provide information regarding possible points of contact between one or more sports players, apparent imbalances in the posture of the injured sports player, etc. In these and other situations, the sensor data may provide a more detailed perspective regarding the presence and/or severity of muscle damage caused by the injury, the timing of the injury (e.g., muscle tearing before the sports user falls), and/or the cause of the injury.

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

FIG. 5 illustrates an example computing system 500, according to at least one embodiment described in the present disclosure. The computing system 500 may include a processor 510, a memory 520, a data storage 530, and/or a communication unit 540, which all may be communicatively coupled. Any or all of the activity sensor 200 of FIG. 2 may be implemented as a computing system consistent with the computing system 500, including the EMG sensor 210, the processor 220, the wireless module 230, the accelerometer 240, and/or the power system 250.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform the methods 300 and/or 400 of FIGS. 3 and/or 4, respectively. For example, the processor 510 may obtain sensor data associated with a sports user, obtain image data associated with the sports user, identify a body part associated with each activity sensor, and/or identify movement of the sports user based on the sensor data and the associated body part.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. For example, the memory 520 and/or the data storage 530 may store obtained sensor data. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

One skilled in the art, after reviewing this disclosure, may recognize that modifications, additions, or omissions may be made to the system 500 without departing from the scope of the present disclosure. For example, the system 500 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for carrying or having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method for analysis of muscle movements of a plurality of sports users in a defined environment, the plurality of users each having one or more activity sensors coupled to a respective area of each sports user, the one or more activity sensors being configured to generate sensor data indicative of muscle activity, the method comprising:
   identifying which sports user each of the activity sensors are coupled to, including identifying one or more first activity sensors coupled to a first sports user and identifying one or more second activity sensors coupled to a second sports user from the plurality of sports users in the defined environment;
   obtaining first sensor data from the one or more first activity sensors coupled to a respective area of the first sports user;
   obtaining first image data of the first sports user and of the one or more first activity sensors coupled to the first sports user;
   identifying, by a machine learning model, based on the first sensor data and the first image data, the first sports user as a first particular sports user;
   identifying, by the machine learning model, based on the first sensor data and the first image data, a respective muscle activity of the first particular sports user associated with each respective area to which each of the one or more first activity sensors are respectively coupled; and
   identifying by the machine learning model, a particular movement performed by the first particular sports user based on the identified muscle activity of the first particular sports user.

2. The method of claim 1, wherein the first sensor data from the one or more first activity sensors includes at least one of: electromyography data, biometric data, motion data, orientation data, rotation data, electrical data, sweat data, temperature data, or pressure data.

3. The method of claim 1, further comprising determining a first body posture of the first particular sports user associated with the particular movement performed by the first particular sports user;
   obtaining, by the machine learning model, training sensor data and training image data based on movements of a skilled sports player;
   identifying the particular movement performed by the skilled sports player based on the training sensor data and training image data;
   determining a second body posture associated with the particular movement performed by the skilled sports player;
   comparing the first body posture with the second body posture; and
   identifying one or more differences in performing the particular movement between the first body posture of the first particular sports user and the second body posture of the skilled sports player.

4. The method of claim 1, further comprising analyzing the particular movement of the first particular sports user by determining one or more movement patterns of the first particular sports user, wherein determining the movement patterns of the first sports user comprises:
   obtaining, by the machine learning model, training sensor data and training image data based on movements of the first particular sports user in performing the particular movement;
   identifying one or more habitual movements of the first particular sports user in performing the particular movement;
   comparing the movement of the first particular sports user in performing the particular movement to the habitual movements of the first particular sports user in performing the particular movement; and
   identifying one or more differences between the movement of the first particular sports user in performing the particular movement and the habitual movements of the first particular sports user in performing the particular movement.

5. The method of claim 1, further comprising performing an injury assessment of the first particular sports user, wherein performing the injury assessment comprises:

determining a time at which an injury involving the first particular sports user occurred;
analyzing the sensor data and the image data associated with movement of the first particular sports user at the time at which the injury involving the first particular sports user occurred; and
determining at least one of: a presence of muscle damage caused by the injury, a severity of muscle damage caused by the injury, or a cause of the injury.

6. The method of claim 1, wherein identifying the respective muscle activity associated with each of the respective areas to which each of the one or more first activity sensors are respectively coupled comprises generating a three-dimensional body-pose model or a three-dimensional movement-simulation model for the first particular sports user.

7. The method of claim 1, further comprising identifying a particular second sports user by:
obtaining second sensor data from one or more second activity sensors, wherein each of the one or more second activity sensors is coupled to a respective area of the second sports user;
obtaining second image data of the second sports user and of one or more of the one or more second activity sensors coupled to the second sports user;
identifying, by the machine learning model based on the second sensor data and the second image data, the second sports user as a second particular sports user;
identifying, by the machine learning model, based on the second sensor data and the second image data, a respective muscle activity of the second particular sports user associated with each respective area of the second particular sports user to which the one or more second activity sensors are coupled; and
identifying by the machine learning model, a particular movement performed by the second sports user based on the identified respective muscle activity of the second particular sports user.

8. A system for grouping and analyzing sensor activity, comprising:
one or more activity sensors coupled to a respective area of each sports user of a plurality of sports users in a defined environment, the one or more activity sensors being configured to generate sensor data indicative of muscle activity;
one or more cameras configured to collect image data of the users within the defined environment; and
a computing system communicatively coupled to the plurality of sensors and the one or more cameras, the computing system configured to perform:
identifying which sports user each of the activity sensors are coupled to, including identifying one or more first activity sensors coupled to a first sports user and identifying one or more second activity sensors coupled to a second sports user from the plurality of sports users in the defined environment;
obtaining first sensor data from the one or more first activity sensors coupled to a respective area of the first sports user in which each of the one or more first activity sensors is on the first sports user;
obtaining first image data of the first sports user and of the one or more first activity sensors coupled to the first sports user;
identifying, by a machine learning model, based on the first sensor data and the first image data, the first sports user as a first particular sports user;
identifying, by the machine learning model, based on the first sensor data and the first image data, a respective muscle activity of the first particular sports user associated with each respective area to which each of the one or more first activity sensors are respectively coupled; and
identifying by the machine learning model, a particular movement performed by the first particular sports user based on the identified muscle activity of the first particular sports user.

9. The system of claim 8, wherein the first sensor data from the one or more first activity sensors includes at least one of: electromyography data, biometric data, motion data, orientation data, rotation data, electrical data, sweat data, temperature data, or pressure data.

10. The system of claim 8, wherein the computing system is configured to further perform determining a first body posture of the first particular sports user associated with the particular movement performed by the first particular sports user;
obtaining, by the machine learning model, training sensor data and training image data based on movements of a skilled sports player;
identifying the particular movement performed by the skilled sports player based on the training sensor data and training image data;
determining a second body posture associated with the particular movement performed by the skilled sports player;
comparing the first body posture with the second body posture; and
identifying one or more differences in performing the particular movement between the first body posture of the first particular sports user and the second body posture of the skilled sports player.

11. The system of claim 8, wherein the computing system is configured to further perform analyzing the particular movement of the first particular sports user by determining one or more movement patterns of the first particular sports user, wherein determining the movement patterns of the first sports user comprises:
obtaining, by the machine learning model, training sensor data and training image data based on movements of the first particular sports user in performing the particular movement;
identifying one or more habitual movements of the first particular sports user in performing the particular movement;
comparing the movement of the first particular sports user in performing the particular movement to the habitual movements of the first particular sports user in performing the particular movement; and
identifying one or more differences between the movement of the first particular sports user in performing the particular movement and the habitual movements of the first particular sports user in performing the particular movement.

12. The system of claim 8, wherein the computing system is configured to further perform performing an injury assessment of the first particular sports user, wherein performing the injury assessment comprises:
determining a time at which an injury involving the first particular sports user occurred;
analyzing the sensor data and the image data associated with movement of the first particular sports user at the time at which the injury involving the first particular sports user occurred; and determining at least one of: a presence of muscle damage caused by the injury, a severity of muscle damage caused by the injury, or a cause of the injury.

13. The system of claim 8, wherein identifying the respective muscle activity associated with each of the respective areas to which each of the one or more first activity sensors are coupled comprises generating a three-dimensional body-pose model or a three-dimensional movement-simulation model for the first particular sports user.

14. The system of claim 8, wherein the computing system is configured to further perform identifying a particular second sports user by:
obtaining second sensor data from one or more second activity sensors, wherein each of the one or more second activity sensors is coupled to a respective area of the second sports user;
obtaining second image data of the second sports user and of one or more of the one or more second activity sensors coupled to the second sports user;
identifying, by a machine learning model, based on the second sensor data and the second image data, the second sports user as a second particular sports user;
identifying, by the machine learning model, based on the second sensor data and the second image data, a respective muscle activity of the second particular sports user associated with each respective area of the second particular sports user to which the one or more second activity sensors are coupled; and
identifying by the machine learning model, a particular movement performed by the second sports user based on the identified respective muscle activity of the second particular sports user.

15. One or more non-transitory computer-readable storage media configured to store instructions that, in response to being executed, cause a system to perform operations, the operations comprising:
identifying one or more first activity sensors coupled to a first sports user and identifying one or more second activity sensors coupled to a second sports user from a plurality of sports users in a defined environment, the plurality of users each having one or more first or second activity sensors coupled to a respective area of each sports user, the one or more first and second activity sensors being configured to generate sensor data indicative of muscle activity
obtaining first sensor data from the one or more first activity sensors coupled to a respective area of the first sports user in which each of the one or more first activity sensors is positioned on the first sports user;
obtaining first image data of the first sports user and of the one or more first activity sensors coupled to the first sports user;
identifying, by a machine learning model, based on the first sensor data and the first image data, the first sports user as a first particular sports user;
identifying, by the machine learning model, based on the first sensor data and the first image data, a respective muscle activity of the first particular sports user associated with each respective area to which each of the one or more first activity sensors are respectively coupled; and
identifying by the machine learning model, a particular movement performed by the first particular sports user based on the identified muscle activity of the first particular sports user.

16. The one or more non-transitory computer-readable storage media of claim 15, wherein the operations further comprising determining a first body posture of the first particular sports user associated with the particular movement performed by the first particular sports user;
obtaining, by the machine learning model, training sensor data and training image data based on movements of a skilled sports player;
identifying the particular movement performed by the skilled sports player based on the training sensor data and training image data;
determining a second body posture associated with the particular movement performed by the skilled sports player;
comparing the first body posture with the second body posture; and
identifying one or more differences in performing the particular movement between the first body posture of the first particular sports user and the second body posture of the skilled sports player.

17. The one or more non-transitory computer-readable storage media of claim 15, wherein the operations further comprising analyzing the particular movement of the first particular sports user by determining one or more movement patterns of the first particular sports user, wherein determining the movement patterns of the first particular sports user comprises:
obtaining, by the machine learning model, training sensor data and training image data based on movements of the first particular sports user in performing the particular movement;
identifying one or more habitual movements of the first particular sports user in performing the particular movement;
comparing the movement of the first particular sports user in performing the particular movement to the habitual movements of the first particular sports user in performing the particular movement; and
identifying one or more differences between the movement of the first particular sports user in performing the particular movement and the habitual movements of the first particular sports user in performing the particular movement.

18. The one or more non-transitory computer-readable storage media of claim 15, wherein the operations further comprising performing an injury assessment of the first particular sports user, wherein performing the injury assessment comprises:
determining a time at which an injury involving the first particular sports user occurred;
analyzing the sensor data and the image data associated with the movement of the first particular sports user at the time at which the injury involving the first particular sports user occurred; and
determining at least one of: a presence of muscle damage caused by the injury, a severity of muscle damage caused by the injury, or a cause of the injury.

19. The one or more non-transitory computer-readable storage media of claim 15, wherein identifying the respective muscle activity associated with each of the respective areas to which each of the one or more first activity sensors are coupled comprises generating a three-dimensional body-pose model or a three-dimensional movement-simulation model for the first particular sports user.

20. The one or more non-transitory computer-readable storage media of claim 15, wherein the operations further comprising identifying a particular second sports user by:

obtaining second sensor data from one or more second activity sensors, wherein each of the one or more second activity sensors is coupled to a respective area of the second sports user;

obtaining second image data of the second sports user and of the one or more of the one or more second activity sensors coupled to the second sports user;

identifying, by a machine learning model, based on the second sensor data and the second image data, the second sports user as a second particular sports user;

identifying, by the machine learning model, based on the second sensor data and the second image data, a respective muscle activity of the second particular sports user associated with each respective area of the second particular sports user to which the one or more second activity sensors are coupled; and identifying by the machine learning model, a particular movement performed by the second sports user based on the identified respective muscle activity of the second particular sports user.

\* \* \* \* \*